April 20, 1948. R. J. MILLER 2,439,981
MOTION PICTURE PROJECTOR
Filed Feb. 21, 1941 2 Sheets-Sheet 1

INVENTOR.
RAYMOND J. MILLER
BY
*A. E. Wilson*
ATTORNEY

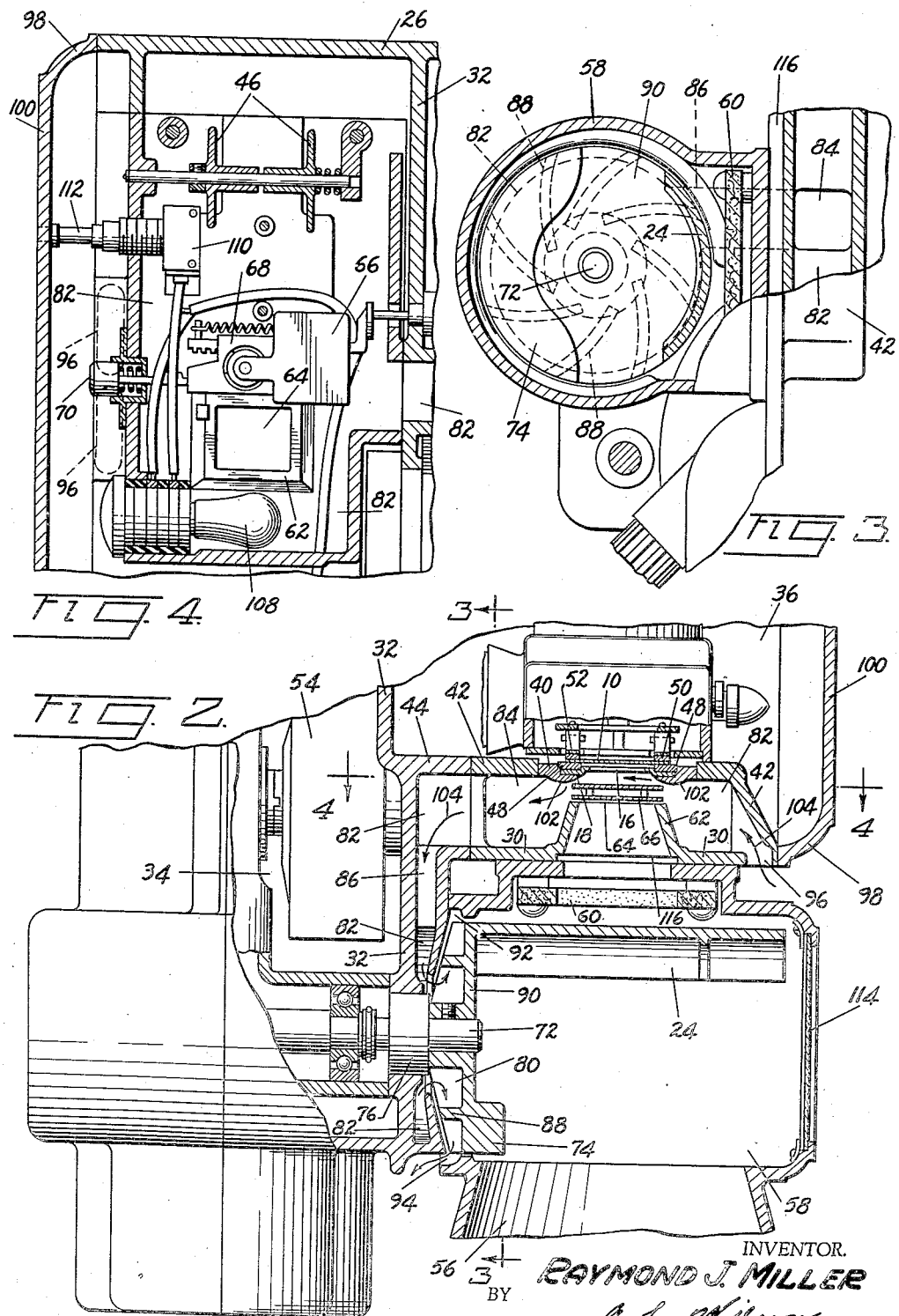

Patented Apr. 20, 1948

2,439,981

UNITED STATES PATENT OFFICE 2,439,981

MOTION-PICTURE PROJECTOR

Raymond J. Miller, Detroit, Mich., assignor to American Pattern and Manufacturing Co., Detroit, Mich., a copartnership Application February 21, 1941, Serial No. 379,962

2 Claims. (Cl. 88—17)

This invention relates to motion picture projectors and more particularly to improved means for cooling the film.

In modern motion picture projectors, independent visual images carried by a strip of film are successively aligned with an aperture and are projected onto a screen by means of a light directed through the aperture and film in such a manner as to create the illusion of motion.

The film may be formed of Celluloid or any other relatively transparent material having the desired qualities of flexibility and durability.

The light employed to project the images from the film onto the screen may emanate from any suitable light source and is directed towards the film aperture in such a manner that the rays of light follow a substantially conical path decreasing in diameter as the aperture is approached. The rays of light become more concentrated as the diameter of the cone decreases and the heat per unit of area increases proportionately.

When the images of the film are in alignment with the aperture and are projected onto the screen, the film is subjected to the full heat intensity of the light. Due to the inflammable nature of the materials heretofore found suitable for projector film, a considerable fire hazard is involved.

An object of this invention resides in the provision of novel means to dissipate heat from the projecting light.

A further object of the invention is to propel a sheet of cooling air across the aperture plate and film to cool the portions of the projector subjected to the heat thereof.

Another object is to provide an improved impeller to force cooling air across the members in such a manner that they are effectively cooled and the light source is not subjected to disturbing air currents.

A still further object of the invention resides in the provision of air propelling means carried by a shutter driving member to move air across an aperture plate between the shutter and the film to dissipate heat.

Yet another object of the invention is to provide a motion picture projector having improved shutter and film ventilating means to absorb heat with minimum interference with the light.

Another object is to provide an aperture and film cooling compartment isolated and substantially sealed from the film compartment in such a manner that dust and dirt are effectively excluded from the film compartment thereby protecting the film guiding and driving mechanism and the projector lenses.

Still another object of the invention resides in the provision of a power driven shutter having impeller blades positioned in such a manner that heat absorbed by the shutter from the projecting light is effectively dispelled to atmosphere.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 2 is a plan view partly in section of a portion of the projector illustrated in Fig. 1.

Fig. 3 is a sectional view taken substantially on the line 3—3 of Fig. 2, looking in the direction of the arrows.

Fig. 4 is a sectional view taken substantially on the line 4—4 of Fig. 2, looking in the direction of the arrows.

Figure 1:
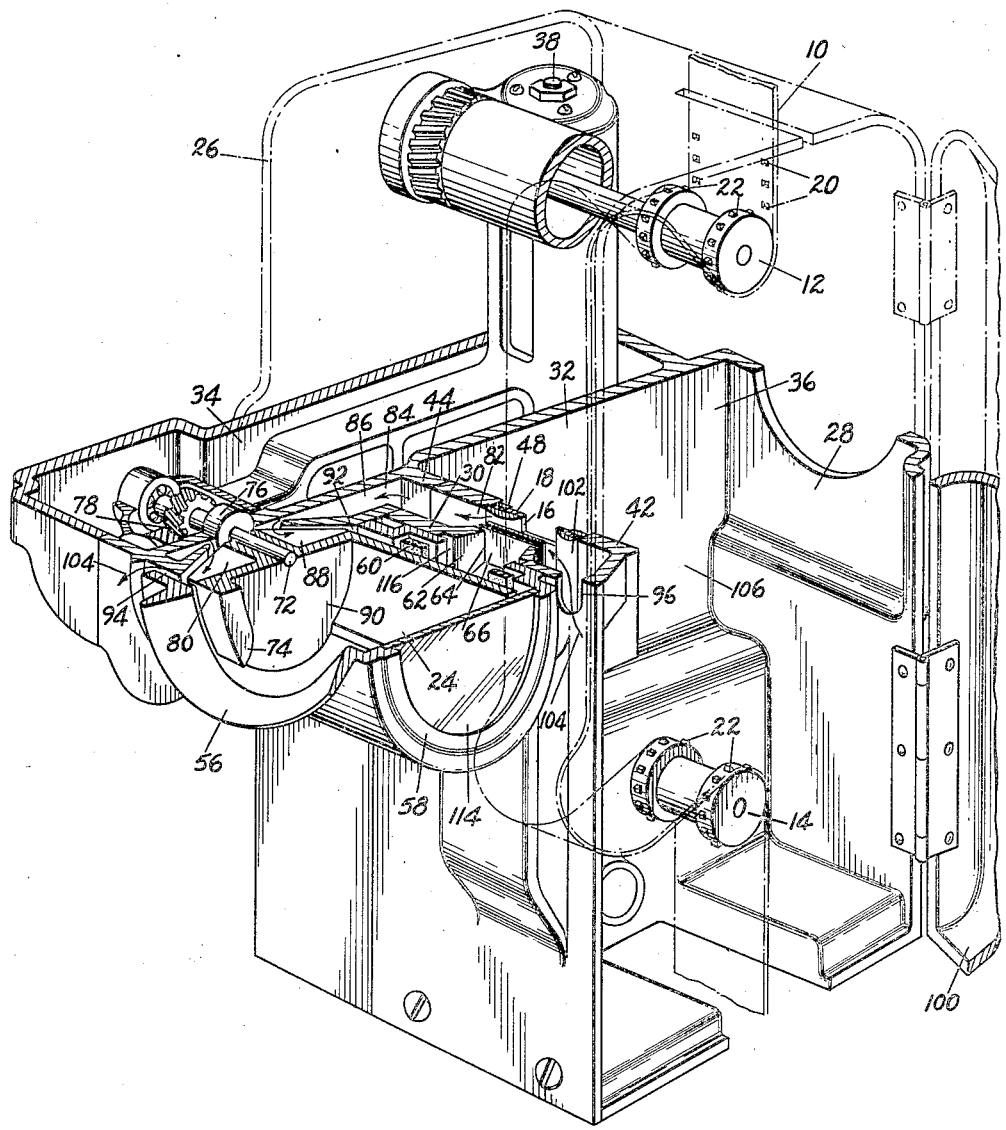
Fig. 1 is a perspective view partly in section of a motion picture projector embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to Fig. 1, it will be observed that the invention is illustrated as being embodied in a motion picture projector wherein a plurality of separate visual images are carried by a strip of Celluloid or other suitable film material 10. In one form of projector used commercially in theaters, the film 10 is approximately thirty-five millimeters in width, and the separate images are carried by a plurality of substantially equally spaced successive frames. Where the thirty-five millimeter film is employed it has been found that very desirable results are obtained where sixteen separate frames are provided in a foot of film.

Means such for example as an intermittently driven sprocket may be provided to intermittently move the film 10 between upper and lower feed sprockets 12 and 14 to intermittently position succeeding frames of the film into alignment with an aperture 16 formed in an aperture plate 18. Light from a suitable source is directed to impinge on the aperture plate 18 and pass through the aperture 16 and the film 10 to project the image from the film onto a screen so positioned as for example in a theater, to be viewed.

In the thirty-five millimeter film generally used for commercial projection the film 10 is provided adjacent each frame with four sprocket receiving apertures or holes 20 to receive sprocket teeth 22 extending radially at the outer edges of the driving sprockets 12 and 14 and an intermittently driven sprocket whereby the film 10 may be moved to position successive frames of film into alignment with the aperture 16. Each of the film driving sprockets is preferably provided with sixteen driving teeth 22 on each side and thus moves four frames of the film in one complete revolution.

The film may move at any predetermined speed. However, it has been found that best results are obtained from the sound equipment now conventionally used with motion picture projectors when the film is driven at a speed of approximately ninety feet or 1440 frames per minute, that is, at the rate of one and one-half feet or 24 frames per second.

To drive the film at this speed the intermittence drive sprocket must be actuated 1440 times per minute, making a quarter revolution each time it is actuated, and the upper and lower feed sprockets 12 and 14 must be continuously driven at a speed of 360 R. P. M.

One complete revolution of the intermittently driven sprocket will move four frames, and since this sprocket makes six complete revolutions per second, it must be actuated through a complete cycle each $\frac{1}{24}$ of a second. This cycle must be further subdivided since an interval of time is required to move the film. Good results have been obtained where this cycle is divided into five equally spaced time intervals of $1/120$ of a second each. One of these time intervals of $1/120$ of a second may be utilized to actuate the intermittently driven sprocket to position the next succeeding frame of the film in alignment with the aperture 16, and each individual frame may be maintained in alignment with the aperture the remaining $4/120$ of a second of each cycle of $\frac{1}{24}$ of a second to permit light from a suitable source to pass through the aperture 16 and film 10 to project the image from the film onto the screen.

A shutter such for example as a rotatable blade 24 is provided to intermittently interrupt the flow of light through the film 10 and aperture 16 to prevent the images on the screen from becoming blurred or streaked as the intermittently driven sprocket moves successive frames of the film 10 into alignment with the aperture 16. The shutter blade again cuts the light substantially 180° later to prevent visible flicker.

Each of the frames of the film is subjected to the full heat intensity of the projecting light during the interval of time when it is aligned with the aperture 16 when the shutter blade 24 is not interrupting the projecting light to prevent visible flicker or to shield movement of the film. Each frame of the film is therefore subjected directly to the heat of the light for approximately $1/48$ of a second while it is aligned with the aperture 16, and in addition is subjected to heat conducted to it through the aperture plate 18. In view of the fact that the film 10 is made of inflammable material, a considerable fire hazard is thus involved.

The component elements of the projector may be carried by a main housing 26 having front and back walls 28 and 30 respectively and an intermediate wall 32 dividing the space within the housing 26 into transversely spaced mechanism and film compartments 34 and 36 respectively.

The mechanism required to drive the film sprockets 12 and 14, the intermittently driven film feeding sprocket, and the shutter 24 may be positioned within the mechanism compartment 34. The driving mechanism preferably includes a generally vertically extending drive shaft 38 operably connected to drive generally horizontally extending shafts projecting through and suitably sealed in the intermediate wall 32 to prevent the escape of lubricating oil from the compartment 34 to the film compartment 36.

A film track carrier 40 supports the aperture plate 18 having the aperture 16 formed therein. The carrier 40 may be supported by an aperture plate housing 42 preferably aligned with a wall 44 projecting transversely from the wall 32.

The film 10 is preferably guided between guide rollers 46 and moves between spaced tracks 48 and shoes 50 yieldingly urged towards the tracks 48 by springs 52. The film is thus maintained in proper alignment with the aperture 16 and restrained from moving a greater distance than is desired each time the intermittently driven sprocket is actuated by the driving mechanism associated with the flywheel 54.

The projecting light may emanate from any suitable source preferably positioned behind the back wall 30 and the light is admitted into the film compartment 36 through a conical housing 56 communicating with a shutter housing 58 having the rotatable shutter blade 24 therein. A fire shield 60 formed of fireproof material such for example as asbestos may be interposed between the shutter housing 58 and a preferably inwardly extending baffle 62 formed in the back wall 30. The baffle 62 terminates in a light admission port 64 aligned with the aperture 16 formed in the aperture plate 18.

A fire shutter or gate 66 mounted on a suitable actuating frame 68, more fully disclosed in my co-pending application Serial No. 250,310, may be provided to automatically close the space between the aperture 16 and port 64 adjacent the baffle 62 to interrupt the flow of projecting light and heat to the film in the event that the projector fails to operate at the desired speed. A manually operated member 70 may be provided to move the fire valve 66 to the operative position illustrated in Fig. 4 when the projector is not operating.

Any desired form of shutter such for example as those disclosed in my co-pending application Serial No. 250,310 may be employed to interrupt the projecting light when the film 10 is being intermittently moved to align succeeding film frames with the aperture 16. One desirable form includes the rotatable shutter blade 24 mounted on a shaft 72 and provided with a counterbalancing weight 74. The shaft 72 projects through a suitable oil seal 76 positioned in the intermediate wall 32 and is operably connected through suitable gearing 78 with a generally horizontally extending shaft which may drive the intermittently driven film feeding mechanism including the flywheel 54.

Means are provided to withdraw heat from the projecting light and to cool the film, aperture plate and the associated parts of the projector subjected to heat during operation of the projector.

One desirable form of such cooling means comprises a blower 80 communicating directly with the atmosphere on one side, and communicating with the atmosphere on its other side by way of a manifold 82 and an aperture cooling chamber 84. The manifold passage 82 is formed by the intermediate wall 32 and the wall 44 aligned with the aperture plate housing 42, a portion of the back wall 30, and an extension 86 thereof. The aperture cooling chamber 84 is positioned between the back wall 30 and baffle 62 on one side, and the aperture plate housing 42, the film track carrier 40, and the aperture plate 18 on the other side.

The blower 80 is provided with impeller blades 88 carried by a disk 90 supporting the shutter blade 24 and the counterweight 74. The blades 88 rotate in a suitable housing 92 communicating with atmosphere on one side by way of a plurality of apertures 94, which by way of example may be discharge apertures.

Cooling air may be withdrawn from the atmosphere through inlet apertures 96 formed in the back wall 30 adjacent the vertical edge of the aperture plate housing 42 adapted to be engaged by a vertically extending portion 98 of a side door 100 to seal the film compartment 36 from the aperture cooling chamber 84.

The cooling air is thus drawn from the atmosphere through the inlet apertures 96 into the aperture cooling chamber 84 where it passes across the aperture plate housing 42, film track carrier 40 and is directed by venturis 102 carried by the film track carrier to impinge on and cool the aperture plate 18 and film 10 aligned with the aperture 16. The cooling air is then propelled through the manifold 82 to the housing 92 of the blower where it is discharged to atmosphere by the blades 88 through the apertures 94. The direction of the flow of air through the aperture cooling chamber 84, manifold 82 and blower 80 is indicated by the arrows 104.

Attention is called to the fact that the flow of cooling air is confined to the aperture cooling chamber 84 and manifold 82, and that the air within the film compartment 36 is not disturbed. The possibility of dirt entering the film compartment to injure the delicate film positioning and moving mechanism and the projector lenses is therefore minimized.

The flow of cooling air into, out of and through the aperture cooling chamber 84 causes virtually no disturbance of air in the shutter housing 58 because the flow of air through the inlet apertures 96 across the chamber 84 to the manifold 82 is less restricted than it is through the shutter housing 58 and the light admission port 64 of the inwardly directed baffle 62. There is thus virtually no tendency for the cooling air to set up disturbing air currents which might interfere with the operation of the light source such for example as an arc light.

If desired, the blower may be a separate unit not associated with the shutter mechanism, and may be positioned in any convenient location to direct cooling air through the space between the aperture plate and the shutter mechanism without departing from the spirit of my invention.

A framing light 108 preferably positioned in the aperture cooling chamber 84 may be provided to permit observation of the film 10 through an observation port positioned forwardly of the aperture plate 18 to determine whether the frames of the film are in proper alignment with the aperture 16. A switch 110 having a plunger 112 positioned to be engaged by the door 100 when in the closed position may be provided to permit the light to be illuminated when the door is open and to shut it off when the door is closed.

A glass 114 positioned in the shutter housing 58 may be provided to permit inspection of the projecting light with reference to the fire shield 60 to facilitate adjustment of the light relative to the aperture plate 18 and aperture 16.

A channel 116 formed in the back wall 30 adjacent the baffle 62 may be provided to receive a valve member whereby the projecting light may be interrupted to facilitate changing over from one projector to another when a reel of film is exhausted or for any other purpose.

This a continuation in part of my co-pending application Serial No. 250,310, filed January 11, 1939, now Patent No. 2,312,663, issued March 2, 1943.

Features disclosed but not claimed herein are being claimed in my co-pending application Ser. No. 741,259, filed April 14, 1947, now Patent Number 2,429,364, dated October 21, 1947.

I claim:

1. In a motion picture projector, a holding, a partition separating said housing into a film compartment and a mechanism compartment, an aperture plate extending from said partition into said film compartment, a blower having one side communicating with the atmosphere, said housing having an opening communicating with the other side of said blower in a path including said plate, a side door for said film compartment, a portion of said door being adapted to close against the adjacent vertical edge of said plate, whereby to obstruct communication between said opening and in front and laterally of said plate.

2. In a motion picture projector, a housing, a partition separating said housing into a film compartment and a mechanism compartment, an aperture plate extending from said partition into said film compartment, a blower having one side communicating with the atmosphere, said housing having an opening communicating with the other side of said blower in a path including said plate, a side door for said film compartment, a portion of said door being adapted to close against the adjacent vertical edge of said plate, and a baffle mounted on a wall of said housing and extending towards the lower edge of said plate, said partition, plate, wall, and baffle forming an obstruction between said opening and parts in front and laterally of said plate.

RAYMOND J. MILLER.

REFERENCES CITED

The following references are of record in the file of this patent:

UNITED STATES PATENTS

| Number | Name | Date |
| --- | --- | --- |
| 1,408,203 | Jenkins | Feb. 28, 1922 |
| 1,758,689 | Del Riccio | May 13, 1930 |
| 1,853,725 | Dina | Apr. 12, 1932 |
| 1,985,629 | Crabtree | Dec. 25, 1934 |
| 2,186,618 | Philips | Jan. 9, 1940 |
| 2,194,585 | Brenkert | Mar. 26, 1940 |